United States Patent [19]

Moslehi

[11] Patent Number: 4,956,538

[45] Date of Patent: Sep. 11, 1990

[54] METHOD AND APPARATUS FOR REAL-TIME WAFER TEMPERATURE MEASUREMENT USING INFRARED PYROMETRY IN ADVANCED LAMP-HEATED RAPID THERMAL PROCESSORS

[75] Inventor: Mehrdad M. Moslehi, Dallas, Tex.

[73] Assignee: Texas Instruments, Incorporated, Dallas, Tex.

[21] Appl. No.: 242,755

[22] Filed: Sep. 9, 1988

[51] Int. Cl.$^5$ .............................................. B23K 26/00
[52] U.S. Cl. .............................. 219/121.6; 219/121.74; 219/354; 219/405; 219/411
[58] Field of Search ............ 219/354, 405, 411, 121.6, 219/121.74; 374/20

[56] References Cited

U.S. PATENT DOCUMENTS

| | | | |
|---|---|---|---|
| 4,345,455 | 8/1982 | Hayes, Jr. | 374/20 |
| 4,417,822 | 11/1985 | Stein et al. | 374/129 |
| 4,698,486 | 12/1987 | Sheets | 219/411 X |

OTHER PUBLICATIONS

Baustian, U. et al., Improved Infrared Temperature Measurement by Utilization of Laser Technology.

*Primary Examiner*—C. L. Albritton
*Attorney, Agent, or Firm*—Douglas A. Sorensen; Rodney M. Anderson; Melvin Sharp

[57] ABSTRACT

A first and second pyrometer (26-28) are optically coupled by a light pipe (24) to a wafer (30) in an apparatus (10). The light pipe (24) passes through a shroud (16) of a heating lamp module (14). A computer (74) is interconnected to the pyrometers (26-28) and a lamp module power supply (80). A laser (48) emits a laser beam (50) through a power meter (86) onto an infrared mirror (56) over the light pipe (24). The mirror (56) directs the beam onto wafer (30) which reflects a portion of the beam back to the infrared mirror (56). The beam is then guided to an infrared photo-detector (58) which provides, in combination with the incident laser beam power meter (86), reflectance of the wafer surface for the laser beam which is related to wafer emissivity. The spectral infrared emissivity measurement can be performed more accurately over an extended temperature range if the transmissivity of the wafer is determined by another infrared photodetector (59) and both the measured wafer reflectance and transmissivity data are used to calculate the emissivity. Wafer emissivity data and pyrometers reading data are evaluated by the computer (74) to determine the true wafer temperature in real-time and to raise or lower the power output from the power supply (80) to adjust the wafer temperature within the apparatus (10).

38 Claims, 2 Drawing Sheets

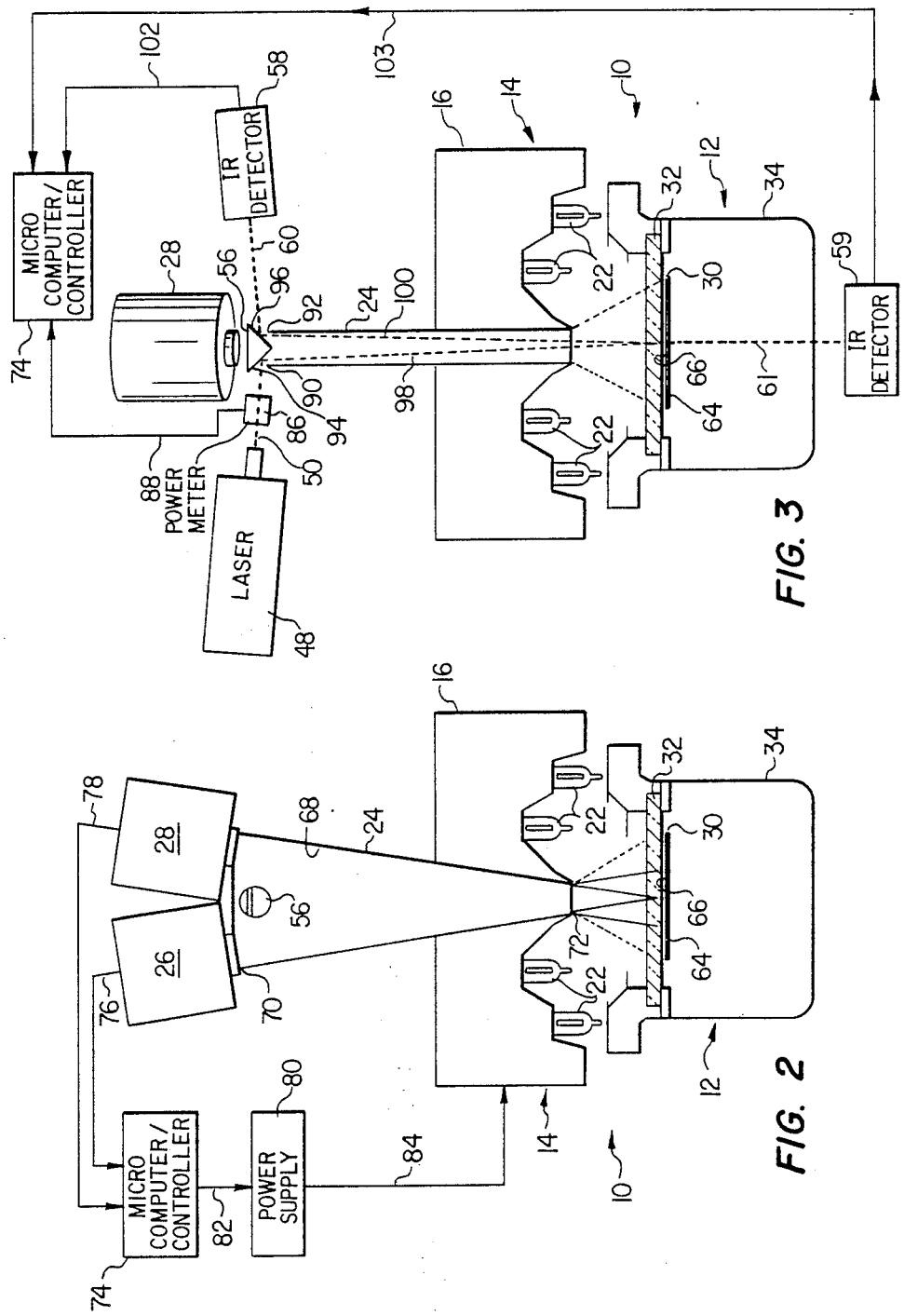

METHOD AND APPARATUS FOR REAL-TIME WAFER TEMPERATURE MEASUREMENT USING INFRARED PYROMETRY IN ADVANCED LAMP-HEATED RAPID THERMAL PROCESSORS

TECHNICAL FIELD OF THE INVENTION

This invention relates in general to semiconductor processing, and in particular to a method and apparatus for precise real-time wafer temperature measurement and adjustment using infrared pyrometry and a laser-assisted wafer surface emissivity measurement probe in single-wafer lamp-heated rapid thermal processors.

BACKGROUND OF THE INVENTION

In a single-wafer rapid thermal processing (RTP) reactor, one of the critical process parameters is the temperature of the wafer. Therefore, it is important to measure the wafer temperature in real-time by a noninvasive and reliable temperature sensing device. Precise, reproducible, noninvasive, and process-independent measurements of the wafer temperature are among the most important requirements of single-wafer optical semiconductor processing tools (such as RTP) in integrated circuit manufacturing.

A typical noncontact temperature measuring device is a single pyrometer which is usually capable of detecting infrared radiation emitted from a heated surface and its subsequent conversion to a temperature. RTP reactors usually comprise a quartz or metallic process chamber inside which the wafer is heated either on both sides by a double bank of heating lamps (tungsten-halogen or arc) surrounding the chamber or only on one side by a single bank of heat lamps. Optical pyrometry has been used as a noninvasive method for wafer temperature measurement in the commercially available RTP systems. However, the accuracy and reproducibility of pyrometry are very sensitive to the wafer surface optical properties (or emissivity), interference by the heating lamps, process environment, and the type of process being performed in the machine. With the double-sided lamp heating arrangement, the pyrometer will usually experience direct radiation exposure from the lamps regardless of the positioning of the pyrometer. However, the disturbance of the pyrometer reading will be minimal if the spectral distribution of the heating photons has no overlap with the pyrometer's operating spectral band or wavelength.

With the single-sided lamp heating arrangement, a hole can be formed through a side of the RTP vacuum chamber opposite the heat lamps in order to insert an optical window, and a pyrometer can be placed near the hole to detect the emitted infrared radiation. This arrangement may be somewhat more suitable than the above-mentioned double heat lamp arrangement since it is free from direct viewing of the lamp and its interference effects. However, a silicon wafer becomes at least partially transparent to the lamp radiation in the infrared region (e.g., "$\gtrsim 1.5$ microns) at lower temperatures (e.g., in the range of $T \lesssim 600°$ C.), so the pyrometer may still be affected by lamp radiation passed through a partially transparent wafer. Thus, there is a need for an improved and reliable method and apparatus to precisely measure the temperature of a wafer in a single-wafer RTP reactor.

SUMMARY OF THE INVENTION

The present invention disclosed herein comprises a method and apparatus for precise real-time wafer temperature measurement and control in a Rapid Thermal Processing (RTP) system or in a lamp-heated Advanced Vacuum Processor (AVP), which substantially eliminates or reduces problems associated with the conventional temperature sensing methods. The present invention allows the monitoring and adjustment of the temperature of a semiconductor wafer in RTP systems on a real-time basis with a high degree of accuracy and reproducibility.

When the temperature of a solid body such as a semiconductor wafer is raised (e.g., by lamp heating), the wafer emits electromagnetic energy mostly in the infrared part of the spectrum. According to Planck's law for blackbody radiation, the emitted radiation covers a continuous and broad range of wavelengths. However, the spectral energy density peaks at a characteristic wavelength and the wavelength corresponding to the peak radiated electromagnetic power ($\mu m$) depends on temperature. This characteristic wavelength is longer at lower temperatures and is shorter at higher temperatures. According to the Wien displacement law, at the maximum spectral energy density point, the product of the characteristic wavelength ($\mu m$ in microns) and temperature (T in degrees kelvin) is a constant:

$$\lambda_m T = 2898 \ \mu m \ K \ \text{or} \ \mu_m = \frac{2898}{T} \ \text{microns}$$

For instance, at a temperature of 1200° C. (1473 K), the peak radiation occurs at a wavelength of $\lambda_m = 1.97$ microns (near infrared). The characteristic wavelength $\mu m$ shifts to 2.47 microns and 5.54 microns at temperatures of 900° C. and 250° C., respectively. Therefore, in the temperature range of 250°–1200° C. (which is the typical range for silicon wafer processing), the peak spectral radiated energy density occurs in the range of approximately 5.5 microns down to 2.0 microns. For maximum signal-to-noise ratio in pyrometry, the operating spectral band of the pyrometer should be within the range of $\mu m$.

In the lower temperature range (up to approximately 700° C.), the spectral emissivity of silicon decreases as the temperature is lowered (for instance, the spectral emissivity of silicon in the infrared part of the spectrum is near 0.7 for $T \gtrsim 800°$ C. and it is reduced significantly at lower temperatures). Emissivity is a measure of the relative efficiency of a heated surface to emit energy by radiation, so the ability of the silicon surface to emit infrared radiation is dependent upon its emissivity. Therefore, to measure the temperature of the wafer precisely using radiation emitted therefrom, it is necessary to know the emissivity of the wafer. The surface emissivity not only depends on temperature but also is sensitive to the presence of single-layer or multilayer thin films (such as oxide, nitride, polysilicon, etc.) on the surface as well as the surface texture (for instance, if the unpolished wafer backside is viewed).

One way to avoid the necessity of measuring the wafer emissivity in real-time is to use a constant precalibrated value for emissivity at all temperatures; however, this does not provide the needed accuracy. An alternative approach is the so-called two-color or ratio pyrometry which employs two pyrometers operating at two adjacent spectral bands. The ratio-pyrometry technique determines the surface temperature by measuring the ratio of the spectral radiances at two wavelengths. It is useful only when the spectral emissivity is independent of wavelength.

The measurement sensitivity of ratio pyrometry is improved when the two wavelengths at which the photo-sensors operate are further apart from each other. However, this also has a disadvantage because the spectral emissivity can become dependent on wavelength over a wider spectral band or window. In general, ratio pyrometry does not solve the emissivity-dependence problem of the pyrometry technique for all different conditions. In practice, in two-color pyrometry the two photo-sensor wavelengths must be close together so that the condition of equality of emittance at the two wavelengths is satisfied. Unfortunately, this condition also degrades the measurement sensitivity. Therefore, real-time measurement of surface emissivity can overcome the limitations of the ratio-pyrometry technique. The real-time monitoring of the wafer surface emissivity is quite valuable because growth and deposition of thin films during various processes such as chemical vapor deposition or thermal oxidation can result in a drift in the pyrometer reading because of emissivity variations.

The present invention utilizes a suitable laser source to determine emissivity in real-time by measuring the reflectance (and if necessary, transmittance) of the wafer for the incident laser beam. Once the emissivity is determined, the pyrometer readings may be properly calibrated to yield an accurate measurement of the wafer temperature. Therefore, temperature may be accurately determined in the low, the medium and the high temperature ranges. Having an accurate and real-time measurement of the temperature of the wafer allows an appropriate adjustment of the heating lamps to provide the desired wafer temperature or thermal cycle.

When a laser beam is sent onto the wafer surface, it can experience reflection, transmission, and absorption. A fraction of the beam power is reflected at the surface (reflection angle same as the incident angle) and the remainder of the incident power enters the wafer. A portion of the entered beam power is lost by absorption in the bulk of the wafer and a fraction of the beam incident power escapes the bottom surface of the wafer. Assuming that a fraction R of the incident beam power is reflected on the surface and a fraction T is transmitted through the wafer, the spectral emissivity $\epsilon$ can be determined using Kirchoff's law:

$\epsilon = 1 - R - T$

The parameters, R and T can be determined by measuring the ratios of the reflected and the transmitted laser beam powers with respect to the incident beam power using infrared sensors. In some cases, only a measurement of R may be enough in order to estimate the emissivity and track it in real-time (this is, for example, true when T is a function of R or when the wafer temperature is high enough such that T=0).

In accordance with one aspect of the invention, an apparatus determines the temperature of a semiconductor wafer in a single-wafer RTP reactor having a one-sided heating lamp module without any direct disturbance by the lamp photons. At least one pyrometer is properly positioned such that the heating lamp module is between the pyrometer and the wafer in the reactor. A light pipe optically couples the pyrometer and the wafer (its backside in the case of face-down wafer processing) through the lamp module such that the pyrometer sensor can collect a fraction of the infrared radiation emitted from the wafer. Therefore, the wafer temperature can be determined without any interference from any direct radiation from the lamps.

In another aspect of the present invention, an infrared laser is provided to transmit a beam of light onto an infrared mirror above the hollow light pipe which subsequently reflects the beam onto the wafer surface via the hollow light pipe. The wafer then reflects a fraction (R) of the beam power back into the light pipe which is then guided into a photo-detector positioned opposite the laser. Another photo-detector may be positioned on the opposite side of the wafer to detect the faction (T) of the incident beam power which is transmitted through the wafer. A computer collects the data from the laser, the infrared photo-detectors and the one or more pyrometers to provide a real-time temperature-monitoring and adjustment capability.

It is a technical advantage of the present invention that the temperature of a semiconductor wafer may be precisely measured on a real-time basis throughout the operating temperature range of a reactor (e.g. 250–1200° C.). It is a further technical advantage that the emissivity of the wafer may be determined in real-time inside the process chamber in order to account for emissivity variations with temperature and formation of thin films as well as its variations from wafer to wafer. It is a still further technical advantage that the wafer temperature may be adjusted if necessary on a real-time basis.

BRIEF DESCRIPTION OF THE DRAWINGS

For a more complete understanding of the present invention and for further advantages thereof, reference is now made to the following Detailed Description, taken in conjunction with the accompanying Drawings, in which:

FIG. 2 is a front cross-sectional view of the present invention; and

FIG. 3 is a side cross-sectional view of the present invention.

DETAILED DESCRIPTION OF THE INVENTION

Figure 1:
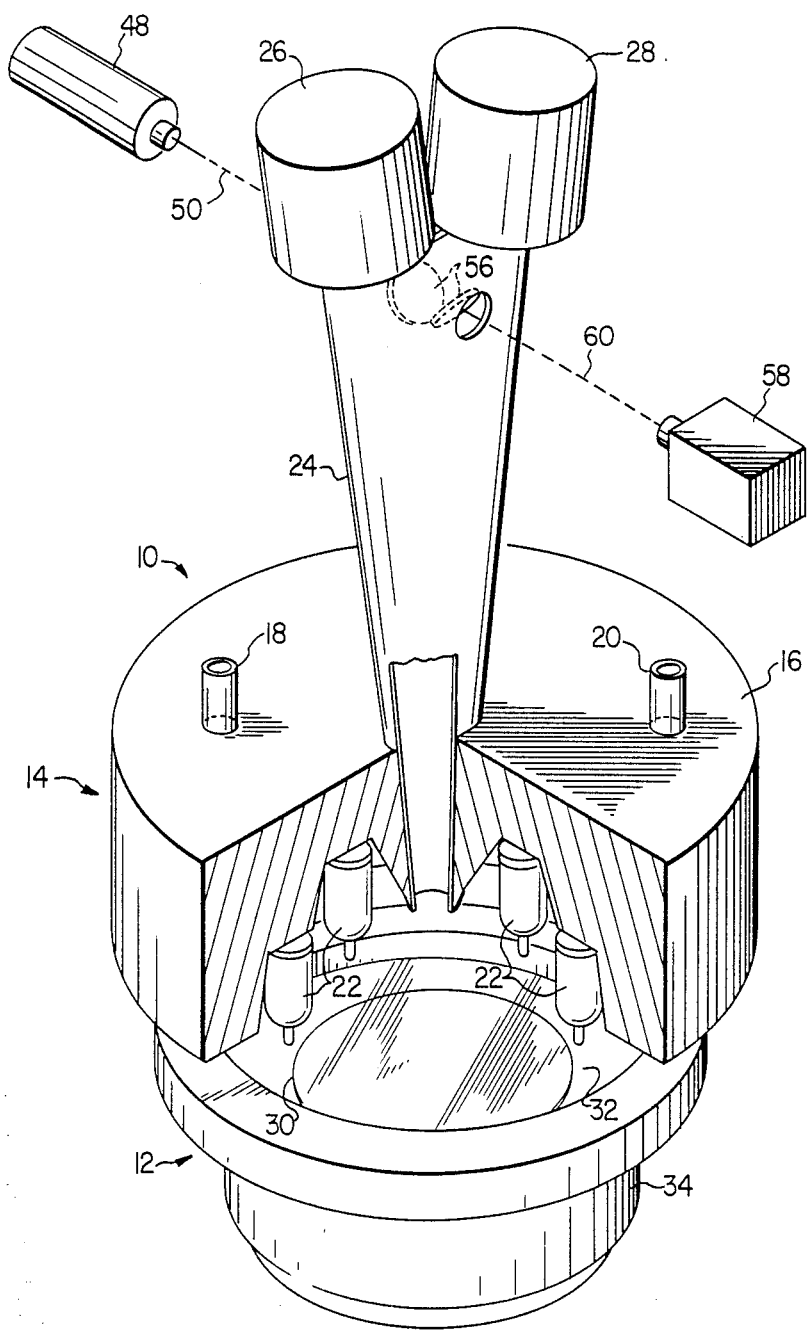
FIG. 1 is an isometric view partially cutaway of an apparatus constructed in accordance with the preferred embodiment of the invention.

In FIGS. 1 through 3, like items are identified by like and corresponding numerals for ease of reference. Referring to FIG. 1, a partially cutaway perspective of an apparatus constructed in accordance with the preferred embodiment of the present invention is generally identified by the reference numeral 10. The apparatus 10 comprises a single wafer rapid thermal processing (RTP) reactor 12 having a one-sided heating lamp module 14. The apparatus 10 is used for semiconductor wafer processing such as for rapid thermal annealing damage removal and electrical activation of ion-implanted junctions, rapid thermal oxidation, and chemical vapor deposition processes.

All fabrication processes within RTP 12 are dependent upon temperature, and the wafer heating required for the processing is provided by module 14. Module 14 typically comprises a water-cooled metallic shroud and reflector 16 having a water inlet pipe 18 and a water outlet pipe 20 for the circulation of a cooling liquid. Shroud 16 serves to cool module 14 and provides an optical reflector on its bottom surface for a plurality of lamps 22 such as tungsten-halogen lamps.

The preferred embodiment of this invention employs two infrared pyrometers operating at two different wavelengths. The two wavelengths are chosen to maximize the signal-to-noise ratio of the temperature measurements and to eliminate any spectral overlap with the heating lamp output. A key part of this invention is the way that the pyrometers are implemented in the RTP tool in order to meet the measurement and the process requirements.

A hollow metallic light pipe 24 is inserted through the module 14 to allow a first pyrometer 26 and a second pyrometer 28 to receive infrared radiation emitted from a heated wafer 30. A window 32 which preferably comprises sapphire is secured over a vacuum process chamber 34 of RTP 12 to allow the infrared radiation from wafer 30 to reach pyrometers 26 and 28. Sapphire is preferred over quartz because of sapphire's superior optical, thermal and mechanical properties. Sapphire transmits wavelengths of light from 0.15-5.5 microns from the ultraviolet to the infrared range. However, the transmission band of quartz is typically in the range of 0.25-3.0 microns. As will be discussed subsequently in more detail, the desired operating range is 3.8-5.1 microns which is beyond the range of quartz. The choice of pyrometers with wavelengths in the range of 3.8-5.1 microns also ensures zero spectral overlap with the heating lamp photons. This is due to the fact that the quartz jackets of the tungsten-halogen lamps suppress the long-wavelength photons so that the spectral power density of the lamp output is effectively zero beyond 3.5 microns. Additionally, sapphire has approximately twenty times more thermal conductivity and approximately eight times more tensile strength than quartz. Thus, the thermal mass of a sapphire window is substantially less than a quartz window which minimizes temperature measurement uncertainties due to heating of the vacuum window.

The two pyrometer sensors used for measurements in the low-to-medium (e.g., 250°-600° C.) and medium-to-high (e.g., 400°-1200° C.) temperature ranges operate in the infrared bands at 3.8 microns, and at 5.1 microns which are both outside the quartz transmission band. The output readings of the pyrometers 26 and 28 are fed to a computer 74 (FIG. 2) such as a microcomputer/controller which is readily available through commercial sources. A heating lamp module power supply 80 (FIG. 2) provides electrical power for the heating module 14 under the control of the computer/controller. The computer adjusts the power output of the power supply by interpreting temperature data received from pyrometers 26 and 28 and according to the desired set value for wafer temperature as will be subsequently described in greater detail.

Since the processes within RTP 12 are dependent upon temperature, it is essential to know the real-time temperature of wafer 30. To obtain an accurate temperature readout over the entire operating range (250° C.-1200° C.) of RTP 12, it is necessary to know the surface emissivity of the wafer being heated. Emissivity changes for a silicon semiconductor surface with temperature particularly in the lower temperature range (T<700° C.) or with formation of thin films on the surface during wafer processing. Either change is significant enough to effect any attempt to determine the actual temperature. Therefore, it is advantageous to obtain the emissivity of wafer 30 in real-time to have an accurate temperature determination.

To determine emissivity, a laser 48 transmits a beam 50 of a known wavelength of infrared light (in the range of 3.8-5.5 microns) through a power meter (not shown). The power meter provides an accurate measurement of the power of incident beam 50 to the computer. Beam 50 then is guided onto an infrared mirror 56 as will be subsequently described in greater detail. Opposite laser 48 is an infrared photo-detector 58 for receiving the reflected laser beam 60 as will be subsequently described in greater detail. The detector 58 transmits the power reading of beam 60 to the computer. If necessary, another infrared photo-detector may be placed on the opposite side of the wafer outside the process chamber in order to measure the power of the transmitted portion of the laser beam.

The computer compares the power of beam 50 and beam 60 to obtain the reflectivity and determine emissivity of wafer 30. The power of the transmitted beam can be compared to the power of the incident beam in order to extract the transmissivity (second photo-detector is not shown in FIG. 1). Emissivity is obtained either from the measured reflectivity or from the combination of measured reflectivity and measured transmissivity for the laser beam. Thus, the computer is provided with emissivity and pyrometer reading data which enables real-time temperature measurement of wafer 30 throughout the operational heating range (250° C.-1200° C.) of RTP 12, for various wafer surface conditions.

Referring to FIG. 2, a cross-sectional view of a dual pyrometer temperature sensing arrangement is shown. The wafer 30 is placed within the vacuum chamber 34 of RTP 12 with the device side 64 face down. An unpolished backside 66 is placed proximate the window 32 which preferably comprises sapphire. It is preferable to use sapphire rather than the more commonly used quartz to form window 32 because sapphire allows the proper wavelength of infrared radiation as used with the preferred embodiment to pass therethrough.

To measure the temperature of wafer 30, a first pyrometer 26 and a second pyrometer 28 are provided. First pyrometer 26 is selected with an operating spectral band centered at approximately 3.8 microns while second pyrometer 28 has an operating band centered at nearly 5.1 microns (the choice of pyrometer wavelengths is somewhat flexible).

The hollow light pipe 24 optically couples pyrometers 26 and 28 through shroud 16 with the wafer 30. Light pipe 24 allows pyrometers 26 and 28 to receive infrared radiation from the heated wafer 30 without direct interference from the lamps 22. Light pipe 24, generally conical in shape as viewed in the cross-section of FIG. 2, is preferably constructed of a metal such as aluminum which is wafer-cooled on its outer surface by shroud 16. Light pipe 24 has an interior surface 68 coated with an infrared reflective material such as gold or tungsten. A first end 70 of light pipe 24 is coupled to first and second pyrometers 26-28 while a second end 72 remains open proximate window 32. Second end 72 is provided with an opening as large as possible to obtain the best possible view of wafer 30 yet not too large to interfere with the wafer temperature uniformity and the cooling and light reflecting operation of shroud 16. It has been found that an opening diameter of 0.5 to 1.0 inch is preferable for second end 72. Installed above light pipe 24 is an infrared mirror 56 which will be subsequently described in greater detail.

The output readings of pyrometers 26 and 28 are fed to a computer 74 by cables 76 and 78. Computer 74 monitors the readings from pyrometers 26 and 28 and adjusts the output of the lamp power supply 80 which is interconnected thereto through a cable 82. Power supply 80 then raises or lowers the temperature of wafer 30 by adjusting the power applied to heating module 14 through connecting cable 84.

Thus, the pyrometers 26 and 28 are able to monitor the temperature of the wafer 30 and provide temperature data to the computer 74. Computer 74 then increases or decreases the power output of power supply 80 to change the temperature of wafer 30 as needed.

The temperature data provided by pyrometers 26 and 28 are sufficiently accurate in the overlap operating temperature range (400° C.–700° C.) of the two pyrometers and in the high temperature range (over 700° C.). In the overlap range a ratio of the two pyrometer readings may be used by the computer 74 to obtain an accurate temperature based on the principles of ratio pyrometry regardless of the emissivity of wafer 30. Additionally, spectral infrared emissivity does not change significantly in the over 700° C. range to affect the accuracy of the pyrometer readings even without the implementation of the real-time emissivity measurement device. However, in the lower temperature range, silicon emissivity changes significantly with temperature and must be known to accurately determine the wafer temperature. Thus when operating in the lower temperature ranges and/or when the wafer emissivity is modified by presence of thin layers of materials on the surface, further instrumentation is required for real-time wafer emissivity measurement.

Referring to FIG. 3, a cross-sectional view transverse to FIG. 2 is illustrated. In order to provide emissivity data to computer 74, a laser 48 is provided. Laser 48 may be a tunable infrared laser such as a carbon monoxide (CO) gas laser (emitting infrared radiation in the range of 5.3–5.7 microns), a gas $CO_2$ or a lead-salt diode laser. It is economically preferable to use a fixed wavelength or tunable CO laser having an operating range near 5.3 microns. Another possible choice would be a gas $CO_2$ laser (10.6 λm output beam) with a frequency doubler device to emit a laser beam having a wavelength of approximately 5.3 microns. An example of a frequency doubler which may be used is nonlinear optical crystals such as silver/gallium/selenide ($AgGaSe_2$) using a second harmonic generation technique.

Laser 48 emits a laser beam 50 of the known wavelength (e.g. near 5.3 microns) to a power meter 86 (such as a beam splitter and an infrared detector) which provides an accurate measurement of the power of the incident beam 50. The incident power reading is transmitted to computer 74 through cable 88 to be used in subsequent calculations. After passing through power meter 86, infrared laser beam 50 strikes infrared mirror 56 installed over light pipe 24. Mirror 56 is positioned properly over pipe 24 (which is rectangular shaped in FIG. 3) without any interference with the operation of pyrometers 26 and 28 (only pyrometer 28 shown). Mirror 56 is positioned to allow reflected laser beam 100 and incident laser beam 98 to exit and enter light pipe 24 over top edges 90 and 92 (or through small holes near the top edges of the light pipe).

Mirror 56 comprises an infrared mirror having a first reflective surface 94 and a second reflective surface 96. Laser beam 50 strikes first reflective surface 94 which reflects an incident beam 98 through window 32 onto unprocessed backside 66 of wafer 30. Wafer 30 reflects a portion of laser beam 98 and returns a reflected beam 100 to the second reflective surface 96. Surface 96 then reflects reflected beam 100 as indicated by beam 60 over top edge 92 to an infrared photo-detector 58.

Infrared detector 58 measures the power of beam 60 and its output electrical signal is transmitted to computer 74 through cable 102. Computer 74 then compares the power of incident laser beam 50 with the power of reflected laser beam 60 to determine the emissivity of wafer 30. With a real-time knowledge of the emissivity of wafer 30, computer 74 is able to correctly analyze the data from pyrometer 28 and accurately determine the true temperature of wafer 30. Therefore, the current invention also provides accurate temperature data on a real-time basis in all operating temperature ranges to allow appropriate adjustment of the amount of wafer heating provided by module 14.

If necessary, a second infrared photo-detector 59 may be properly positioned (depending on the details of the RTP system process chamber design) below wafer 30 outside process chamber 34 to receive a transmitted laser beam 61. Detector 59 measures the power of beam 61 and its electrical output signal is transmitted to computer 74 through a cable 103. Computer 74 may then use a combination of the measured transmissivity and the reflectivity data to determine spectral emissivity precisely over a wide range of temperatures.

An additional benefit from the use of laser 48 is the ability to determine whether any deposits are being made on the unprocessed side (or unpolished backside) 66 of wafer 30. This is particularly useful if deposits are supposed to be made on device side 64 only. Any process-induced deposits on the wafer backside can be detected from a drift of the wafer emissivity measured by the laser-assisted emissivity measurement device.

In operation, the desired operating temperature and thermal cycle of RTP 12 is preselected for the desired process. The wafer 30 is placed device side 64 face down on support pins (not shown) within vacuum process chamber 34. Sapphire optical/vacuum window 32 allows water heating by applying power lamp heating module 14. A combination of data from laser 48 and pyrometer 28 is supplied to computer 74 which uses the combined data to monitor temperature and emissivity and appropriately control the output of lamp module power supply 80.

If the operating temperature is in the medium range (400° C.–700° C.), the computer 74 can utilize a ratio of data from pyrometer 26 and pyrometer 28 to determine and adjust the temperature based on ratio pyrometry concepts. Finally, if the operating temperature is over 700° C., the computer 74 uses temperature data solely from pyrometer 26 (3.8 μm pyrometer) to accurately determine and adjust the wafer temperature (the real-time measured emissivity may be used along with a pyrometer reading to further enhance the precision of temperature determination even in the high-temperature regime). The use of two infrared pyrometers with two different operating wavelengths (3.8 μm and 5.1 μm) instead of a single pyrometer provides enhanced measurement signal-to-noise ratio over an extended temperature range.

Although the present invention has been described with respect to a specific preferred embodiment thereof, various changes and modifications may be suggested to one skilled in the art and it is intended that the present invention encompass such changes and modifications as fall within the scope of the appended claims.

What is claimed is:

1. Apparatus for determining and adjusting temperature of a semiconductor wafer in a single-wafer rapid thermal processing reactor utilizing a heating lamp module, comprising:
   at least one pyrometer position with the heating lamp module between said pyrometer and the wafer;
   a light pipe optically coupling said pyrometer and the wafer through the lamp module, such that said pyrometer may determine the temperature of the wafer;
   a lamp power supply; and
   a controller for adjusting output from the lamp module based on input from said pyrometer, such that the wafer temperature may be adjusted.

2. The apparatus of claim 1, wherein said at least one pyrometer comprises:
   a first pyrometer for determining a first range of temperatures; and
   a second pyrometer for determining a second range of temperatures.

3. The apparatus of claim 2, wherein said first pyrometer detects infrared radiation having a wavelength characteristic of said first range of temperatures.

4. The apparatus of claim 2, wherein said second pyrometer detects infrared radiation having a wavelength characteristic of said second range of temperatures.

5. The apparatus of claim 1, further including a sapphire window disposed between said light pipe and the wafer.

6. The apparatus of claim 1, wherein said controller comprises:
   a computer interconnected to said pyrometer; and
   said lamp power supply interconnected to said computer, such that said computer receives temperature data from said pyrometer, evaluates said data and alters output of said power supply to raise or lower the temperature of the wafer.

7. The apparatus of claim 1, wherein said light pipe comprises a water-cooled hollow metallic pipe having infrared reflective internal walls coated with a plating material.

8. The apparatus of claim 7, wherein said metallic pipe comprises aluminum.

9. The apparatus of claim 7, wherein said plating material comprises gold.

10. The apparatus of claim 7, wherein said plating material comprises tungsten.

11. The apparatus of claim 1, further
    a laser;
    at least one infrared photo-detector;
    an infrared mirror to direct an incident laser beam from said laser onto the wafer and to direct a reflected laser beam from the wafer to said infrared photo-detector; and
    a computer interconnected to said laser and said detector to monitor any power change between said incident and said reflected laser beams, such that emissivity of the wafer may be determined.

12. The apparatus of claim 11, wherein said laser comprises a tunable laser.

13. The apparatus of claim 11, wherein said laser comprises a carbon monoxide gas infrared laser.

14. The apparatus of claim 11, wherein said laser comprises:
    a gas carbon dioxide laser; and
    a frequency doubler.

15. The apparatus of claim 11, wherein said laser comprises a lead-salt tunable diode laser.

16. Apparatus for monitoring and adjusting real-time temperature of a silicon semiconductor wafer in a single-wafer rapid thermal processing reactor having a heating lamp module, comprising:
    at least one pyrometer for detecting wafer emitted infrared radiation;
    a light pipe passing through the lamp module;
    an infrared laser;
    an infrared mirror over said light pipe for directing an incident light beam from said laser to the wafer, and for directing a reflected light beam from the wafer to an infrared photo-detector, and
    a computer interconnecting said pyrometer, said laser and said detector such that the wafer is monitored and adjusted for the real-time temperature.

17. The apparatus of claim 16, wherein said at least one pyrometer comprises:
    a first pyrometer for determining a first range of temperatures; and
    a second pyrometer for determining a second range of temperatures.

18. The apparatus of claim 17, wherein said first pyrometer detects infrared radiation having a wavelength characteristic of said first range of temperatures.

19. The apparatus of claim 17, wherein said second pyrometer detects infrared radiation having a wavelength characteristic of said second range of temperatures.

20. The apparatus of claim 16, further comprising a sapphire window positioned between said light pipe and the wafer.

21. The apparatus of claim 16, further comprising a heating lamp power supply interconnected to said computer such that said computer receives temperature data from said pyrometer and surface emissivity data from said laser and said detector, enabling said computer to evaluate said temperature and emissivity data and alter output of said power supply to raise or lower the temperature of the wafer.

22. The apparatus of claim 16 wherein said light pipe comprises a water-cooled hollow infrared reflective coated aluminum pipe.

23. The apparatus of claim 22, wherein said coating comprises gold.

24. The apparatus of claim 22, wherein said coating comprises tungsten.

25. The apparatus of claim 16, wherein said infrared laser comprises a tunable laser.

26. The apparatus of claim 16, wherein said laser comprises a carbon monoxide infrared laser.

27. The apparatus of claim 16, wherein said laser comprises:
    a gas carbon dioxide laser; and
    a frequency doubler.

28. The apparatus of claim 16, wherein said laser comprises a lead-salt diode laser.

29. The apparatus of claim 16, further including a second infrared photo-detector to measure the power of a laser beam transmitted through the wafer.

30. A method for determining and adjusting temperature of a semiconductor wafer in a single-wafer rapid thermal processing reactor, comprising the steps of:

providing a single-wafer rapid thermal processing reactor having a heating lamp module and at least one pyrometer;

optically coupling a semiconductor wafer to said at least one pyrometer;

detecting with said at least one pyrometer infrared radiation emitted from said wafer to determine the temperature of said wafer; and adjusting the amount of heat provided to said wafer by said heating lamp module in response to control means responsive to said pyrometer.

31. The method of claim 30, wherein the step of adjusting further includes computer control responsive to said pyrometer.

32. The method of claim 31, wherein the step of adjusting the amount of heat includes the steps of providing a heating lamp module power supply for supplying power to said heating lamp module and controlling the power sent form said power supply to said heating lamp module with said computer control to raise or lower the temperature of said wafer.

33. The method of claim 30, further comprising the steps of:

reflecting a laser beam from the wafer;

detecting the reflected laser beam with an infrared detecting photo-detector; and determining the emissivity of the wafer by comparing the power level of an incident laser beam with said reflected laser beam.

34. A method for monitoring and adjusting real-time temperature of a silicon semiconductor wafer in a single wafer rapid thermal processing reactor having a heat lamp module, comprising the steps of:

detecting infrared radiation emitted from the wafer with at least one pyrometer optically coupled to the wafer;

directing a laser beam against the wafer;

detecting power changes in the laser beam reflected from the wafer; and adjusting the output of a power supply to the lamp module in response to said detected radiation and said power change, such that the real-time temperature of the wafer is monitored and adjusted.

35. The method of claim 34, wherein the step of detecting infrared radiation comprises:

detecting infrared radiation having a wavelength characteristic of a first pyrometer corresponding to a first temperature range; and detecting infrared radiation having a wavelength characteristic of a second pyrometer corresponding to a second temperature range.

36. The method of claim 34, wherein the step of detecting infrared radiation further comprises the step of determining the wafer temperature based on said detected radiation.

37. The method of claim 34, wherein the step of detecting a laser power change comprises:

directing a laser beam through a power meter to an infrared mirror such that said power meter measures the input power of said incident laser beam;

reflecting said beam from the reflector to the wafer;

reflecting a portion of said beam from the wafer to a first infrared photo-detector which measures the power of said reflected beam;

transmitting another portion of said beam through the wafer to a second infrared photo-detector which measures the power of said transmitted beam; and comparing said input power and a combination of said reflected power and said transmitted power with a computer.

38. The method of claim 34, wherein the step of adjusting further comprises evaluating said power change to determine a wafer emissivity and thence to determine a true real-time wafer temperature.

* * * * *